Oct. 4, 1927.
W. A. MITCHELL
1,644,391
FRICTION DRAFT GEAR
Filed June 7, 1923    4 Sheets-Sheet 1
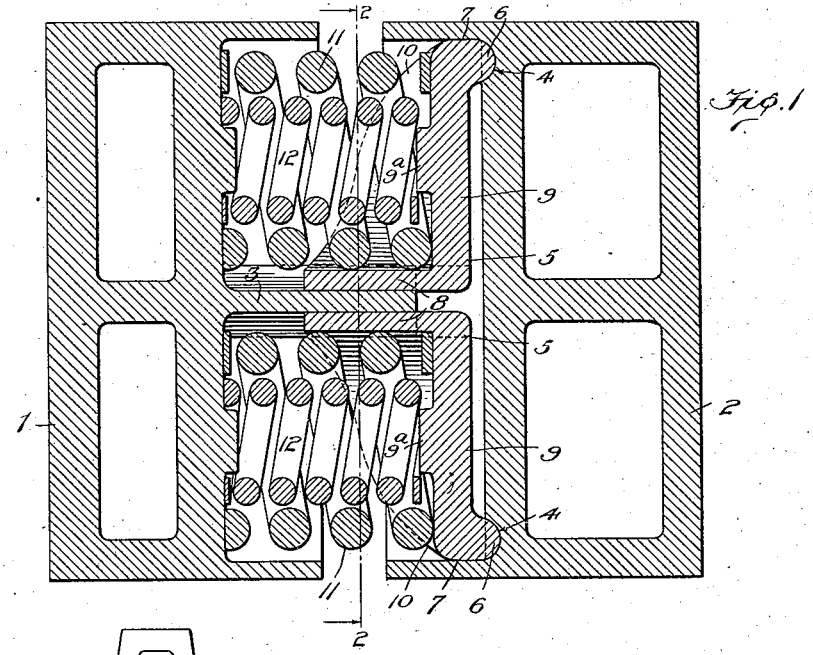
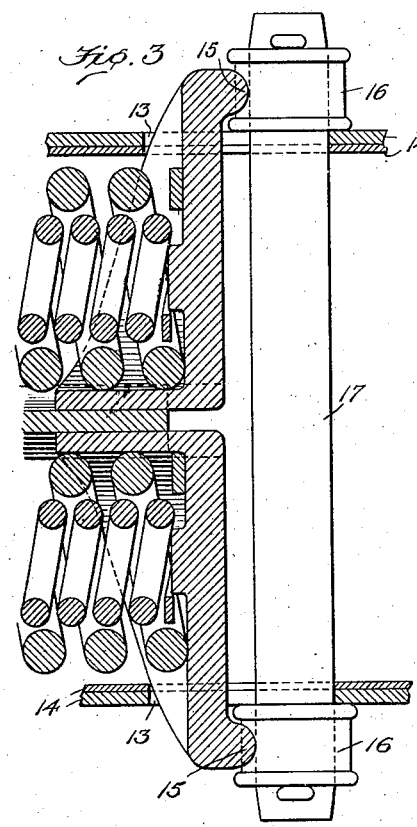
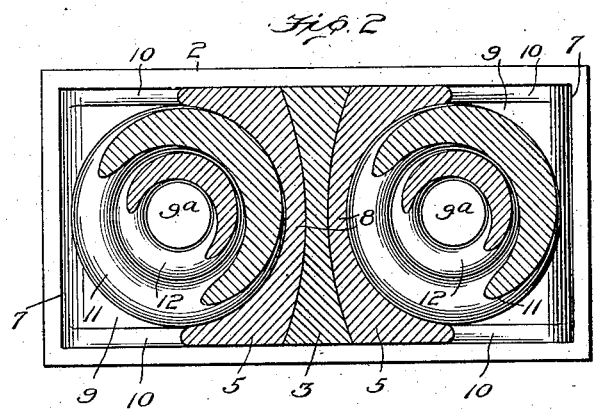
Inventor
William A. Mitchell
By Ernest H. Machlin
his Attorney Oct. 4, 1927.

W. A. MITCHELL 1,644,391

FRICTION DRAFT GEAR

Filed June 7, 1923

Inventor
William A. Mitchell
By
his Attorney

Oct. 4, 1927.                 W. A. MITCHELL                 1,644,391
                             FRICTION DRAFT GEAR
                            Filed June 7, 1923            4 Sheets-Sheet 3
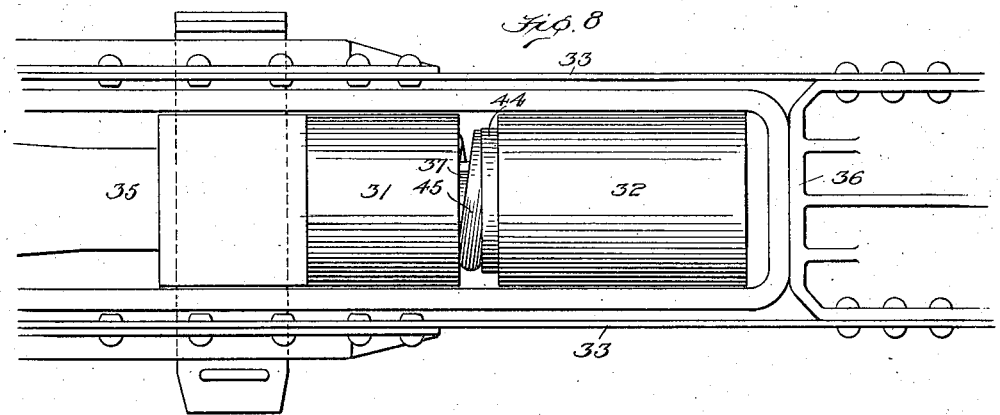
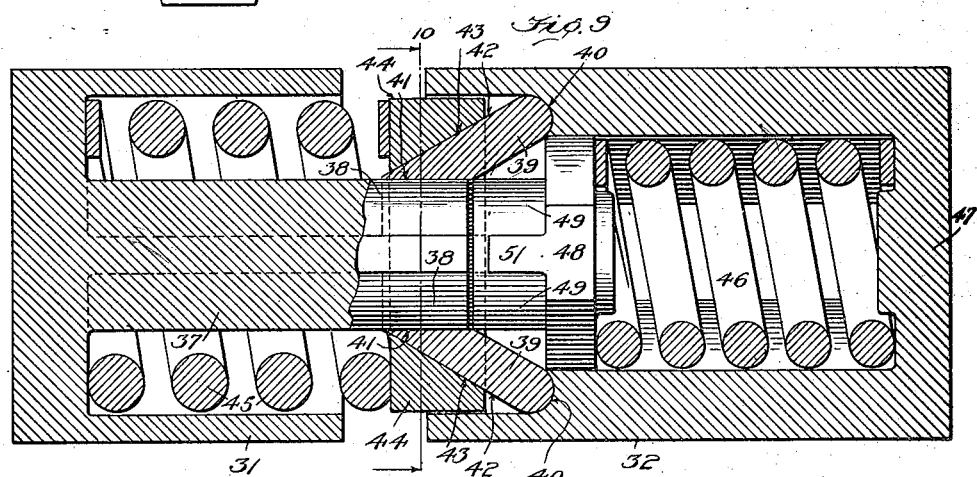
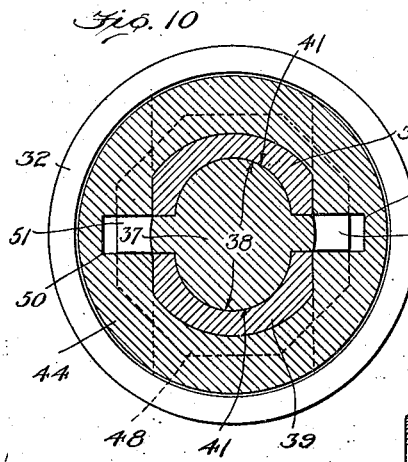
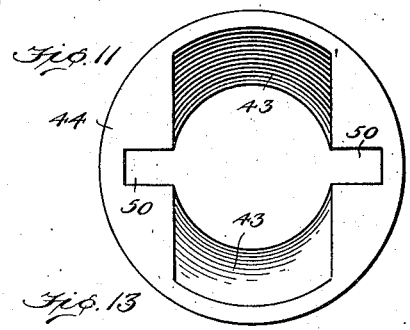
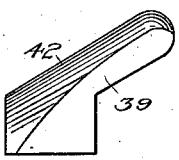

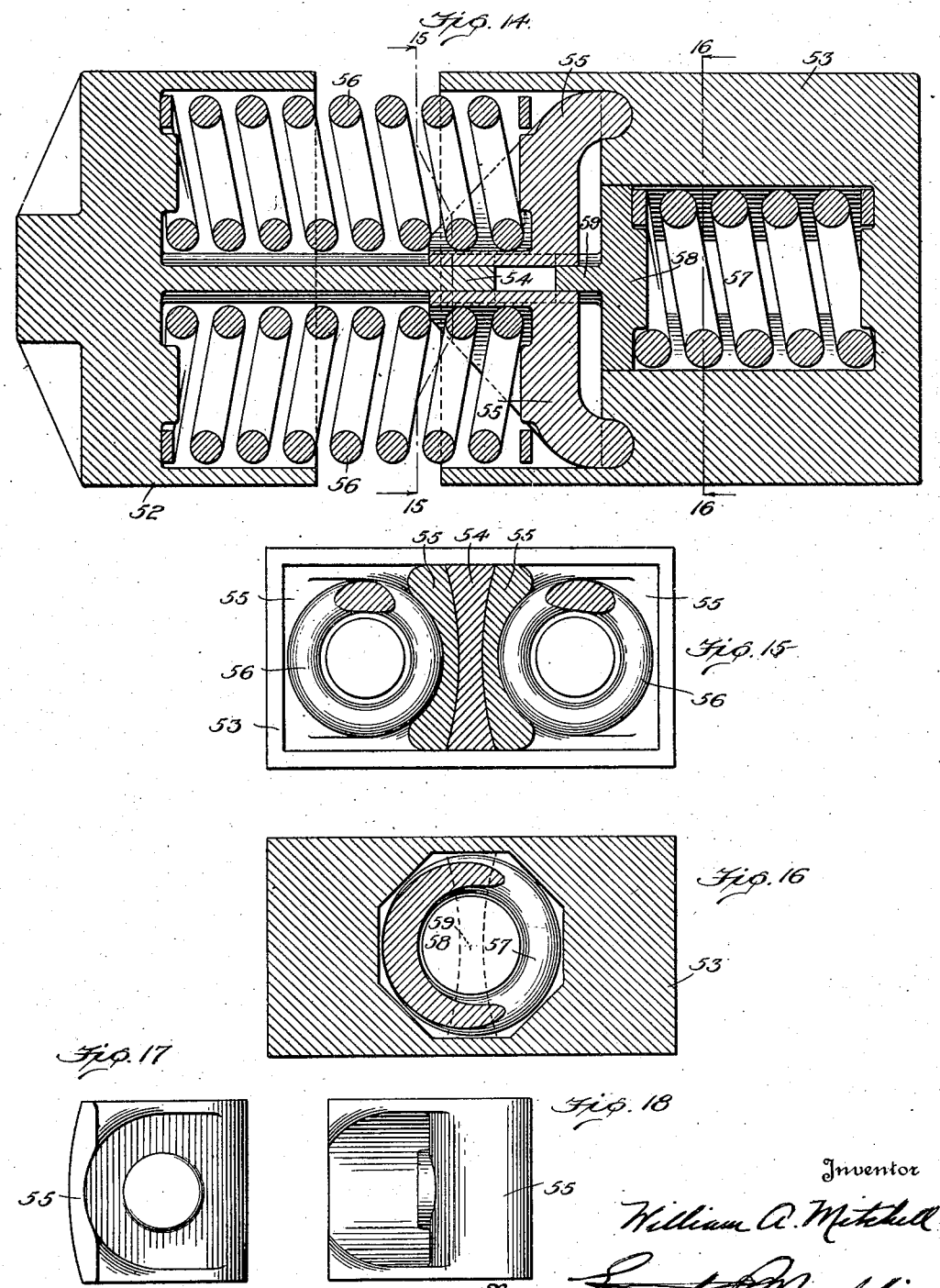

Patented Oct. 4, 1927.

1,644,391

UNITED STATES PATENT OFFICE.

WILLIAM A. MITCHELL, OF DENISON, TEXAS.

FRICTION DRAFT GEAR.

Application filed June 7, 1923. Serial No. 643,895.

My invention relates to draft appliances for railway cars and more particularly to a friction draft gear in which the cooperating parts are constructed and arranged to absorb draft and buffing strains in a comparatively smooth and easy manner.

One of the principal objects of the invention is to provide a friction draft gear including in combination cooperating casings one of which is formed with a centrally located extension having friction surfaces, movable friction shoes having portions adapted to contact said friction surfaces, said friction shoes being movable about their respective fulcrums arranged in the other of said casings and at points preferably near the outer edges thereof, and cushioning means interposed between the cooperating casings, one end of said cushioning means being operably associated with the respective friction shoes for causing the portions thereof which grip the friction surfaces on the centrally located extension to progressively increase the frictional contact between the said shoes and said extension when the casings are moved in effect toward each other.

Another object of the invention is to provide a friction draft gear in which the draft and buffing strains are transmitted through coacting longitudinally movable follower members, one of which is formed with a centrally located and longitudinally disposed friction tongue and the other of which is provided with bearing portions adapted to receive the fulcrum ends of rocking friction members, said friction members having portions adapted to contact opposite sides of the centrally located friction tongue and being adapted to be engaged by one end of the cushioning spring between the fulcrum point and the portion engaging said friction tongue of each friction member.

A further object of the invention resides in the provision of a railway draft rigging including a friction draft gear composed of follower members in the nature of casings, one of which casings is formed with an axially arranged extension having a plurality of friction surfaces, movable friction members fulcrumed in the other of said casings and being provided with portions adapted to engage the respective friction surfaces on the axial extension, cushioning means arranged between the casings, and a supplemental cushioning means carried by one of the casings and being operable by the movement of the said axial extension provided on the other of said casings after a predetermined movement of the first named cushioning means.

The invention has for a still further object the provision of a friction draft gear including an axially disposed friction member, friction shoes having portions cooperating with said member, and wedging means in the nature of a surrounding member adapted to frictionally contact said friction shoes, and cushioning means operable between said wedging means and one of the casings whereby on either buff or draft the wedge means is caused to force the friction shoes into engagement with the axially disposed friction member and progressively increase the frictional resistance offered by the gear.

The invention further consists in the combination, construction and arrangement of the several parts hereinafter described and pointed out in the claims.

In the drawings in which I have illustrated several embodiments of my invention as applicable to both draft gears and buffing gears:

Figure 1 is a longitudinal sectional view through my improved draft gear.

Figure 2 is a transverse sectional view on the line 2—2 of Figure 1.

Figure 3 is a modified form of my improved draft gear in which the friction shoes are fulcrumed at points outside of the draft sills and preferably against a member extending transversely between the draft sills and projecting beyond the outer faces thereof.

Figure 8 is a plan view of still another modified form of the invention shown in position in a railway draft rigging, cylindrical casings being utilized and a wedging means employed to cause the friction shoes to rock into frictional engagement with an axially extending friction member.

Figure 9 is a longitudinal sectional view through the draft gear shown in Figure 8.

Figure 10 is a transverse sectional view on the line 10—10 of Figure 9 viewed in the direction of the arrows.

Figure 11 is a detached view in end elevation of the wedging ring.

Figures 12 and 13 are side and end elevations of one of the rocking friction shoes.

Figure 14 is a longitudinal sectional view illustrating my improved arrangement of cooperating casings and friction members as applied to a buffing gear such as is used on passenger cars for example.

Figure 15 is a transverse sectional view on the line 15—15 of Figure 14 viewed in the direction of the arrows.

Figure 16 is a transverse sectional view on the line 16—16 of Figure 14, viewed in the direction of the arrows.

Figures 17 and 18 are end and side elevations, respectively, of one of the friction shoes.

Figure 4:
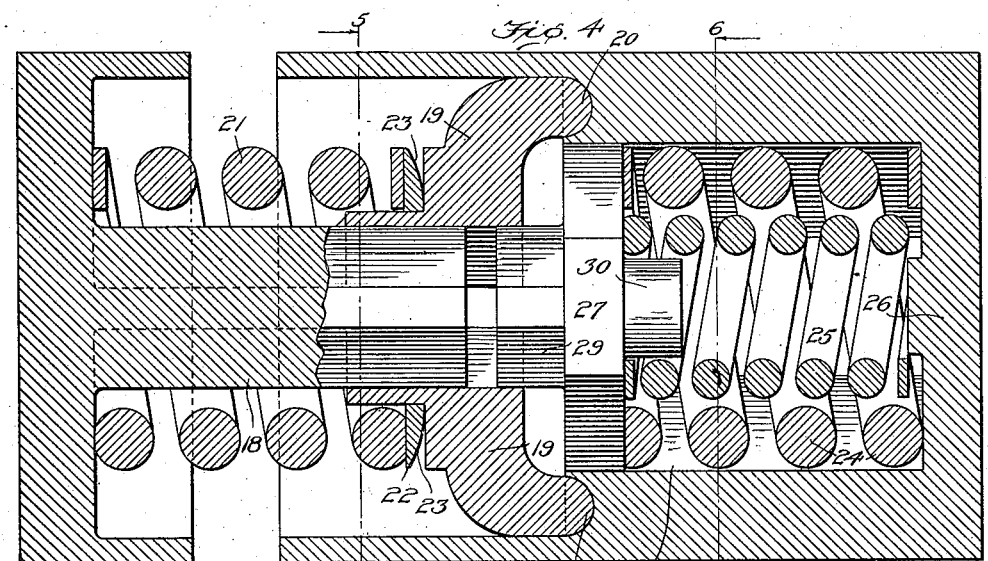
Figure 4 is a sectional view illustrating another modified arrangement of my invention in which cooperating casings are utilized and a single spring employed for actuating the rocking friction shoes.
Figure 5:
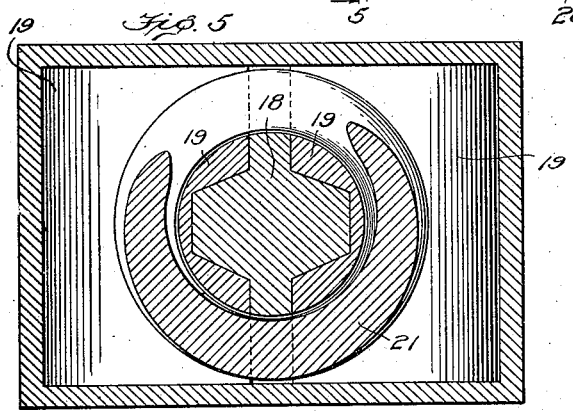
Figure 5 is a transverse sectional view on the line 5—5 of Figure 4.
Figure 7:
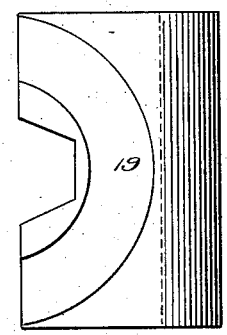
Figure 7 is a detached view in elevation of one of the rocking friction members or shoes.
Figure 6:
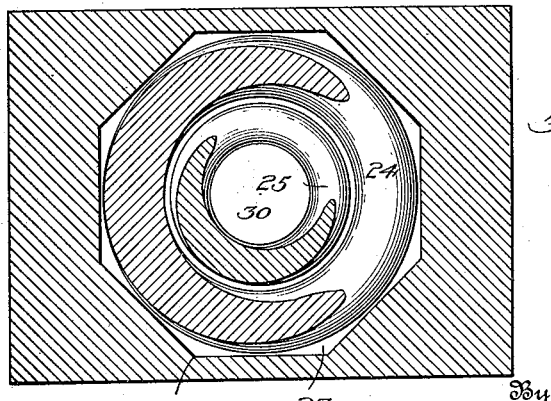
Figure 6 is a similar view on the line 6—6 of Figure 4.

Referring to the drawings in which similar reference characters designate corresponding parts in the several views, and more especially to one of my preferred arrangements of draft gear as shown in Figures 1 and 2, the cooperating casings 1 and 2 are shown of rectangular formation capable of use as the respective front and rear follower members of the draft rigging, a suitable arrangement of cushioning means involving an outer heavy spring and an inner lighter spring, being employed. One of the casings, referred to herein as the front follower member, is provided with a centrally located and longitudinally disposed extension 3, said extension serving to divide the casing into two compartments and being formed upon opposite sides thereof with friction surfaces shown herein as slightly curved and extending across substantially the full width or height of the casing. The extension 3 provides a rearwardly projecting friction tongue sufficiently long to enter the compartment provided in the cooperating casing or rear follower 2. The rear follower or casing 2 is formed with a plurality of bearing portions, said bearing portions being shown herein in the nature of depressions or curved seats 4 located adjacent the outer edges of the casing, as best shown in Figure 1.

The movable friction members or shoes 5 are provided with fulcrum projections 6 adapted to fit within the depressions or seats 4, said friction shoes being mounted for swinging movement about their fulcrum projections toward and away from the central extension or friction tongue 3. The fulcrum projection 6 extends substantially across the full width or height of the casing and provides, together with its cooperating bearing portion 4, an easily manufactured and readily assembled pivotal connection capable of permitting relatively uniform and simultaneous movement of the respective friction shoes when engaging the friction tongue. Relatively flat portions 7 are provided adjacent the fulcrum projections on each friction shoe, said flat portions serving to contact with the inner surfaces of the wall of the casing surrounding that portion of the compartment thereof in which the friction shoes are mounted. Each friction shoe is provided with a longitudinally disposed portion 8 suitably curved to conform to the adjacent coacting friction surface provided on the friction tongue. The opposite surface of the friction shoe may also be curved to provide a semi-cylindrical recess adapted to receive a portion of the cushioning spring. The tongue engaging portion of each friction shoe is preferably connected to the main body portion or end wall 9 thereof by means of the webs or flanges 10 provided upon each side of the friction shoe. One face of the end wall 9 of each friction shoe is adapted to form a bearing surface for the cushioning springs, the inner spring being adapted to surround a projection $9^a$. Each of the friction shoes is substantially L-shaped in general contour, the extending side webs 10 giving to each shoe a cup-like formation capable of receiving the cushioning spring.

The cushioning means shown in Figures 1 and 2 comprises an outer relatively heavy spring 11 and an inner lighter spring 12. One end of each spring is adapted to seat against the end wall or body portion 9 of the friction shoe, the force exerted by said spring being substantially concentrated at points in the friction shoe between its fulcrum point and that portion extending longitudinally of the gear and contacting the friction tongue. The opposite end of each spring bears against the casing or front follower member 1.

Upon movement of the respective casings or follower members toward each other, the loads imparted are transmitted through the cushioning springs to the friction shoes whereupon they are caused to rock about their respective fulcrum points and cause the portions 8 thereof to frictionally engage the tongue 3 upon each side thereof, said frictional engagement being progressively increased as the respective casings continue to move in effect toward each other. While I have shown in this form hollow types of casings shaped to provide a rectangular gear, it will be understood that other shapes and constructions of casings may be employed. When assembled in a draft rigging it will be obvious that on a relative movement of either follower member the respective friction shoes are rocked on their bearings and gradually forced against the longitudinally extending tongue with increasing pressure as the progressive movement of the follower member continues.

In Figure 3 the modified arrangement of coacting friction tongue and rocking friction shoes is accomplished without the utilization of supporting casings, the end wall or body portions being projected laterally through suitable slots 13 in the center sills and cheek plate construction indicated at 14. Fulcrum projections 15 are provided at the ends of the projecting body portions, said projections having a suitable bearing upon detachable collars 16 supported on the transversely extending member 17. In operation, the friction shoes are caused to rock about their fulcrum points and bring the longitudinally extending friction portions into contact with the coacting friction tongue in the same manner as that heretofore described.

The modified arrangement of my improved friction draft gear shown in Figures 4 to 7, inclusive, embodies the same general cooperation between the rocking friction shoes and the centrally disposed friction tongue. The above arrangement of cushioning means is, however, associated with the several parts, as is also a supplemental spring adapted to be operated through the friction tongue after a predetermined movement of the usual cushioning spring. In this modified form the front follower or casing is provided with a laterally extending friction member 18 located centrally of the follower and provided with a plurality of friction surfaces providing in cross section a polygonal friction member best shown in Figure 5. The coacting friction shoes 19 are fulcrumed at 20 within suitable bearings provided in the rear follower or casing, said friction shoes being provided with longitudinally disposed portions having their friction surfaces shaped to conform to the polygonal arrangement of friction surfaces formed on the extension 18. A single spring 21 of relatively heavy capacity is interposed between the front follower and suitable shoulders formed on the friction shoes, said spring being operable against each friction shoe between its fulcrum point and the friction surface adapted to contact its adjacent friction surface on the extension 18. A suitable seating collar 22 having a rounded surface 23 may be interposed between the cushioning spring and the shouldered portions of the respective friction shoes, as best shown in Figure 4.

The supplemental cushioning means provided in the modified arrangement just described comprises an outer spring 24 of heavy capacity and an inner spring 25 of relatively lighter capacity, said springs being encased within the rear follower member and being adapted to operate between one wall 26 of said follower member and a follower 27 relatively movable within the said rear follower. The follower 27 is preferably polygonal in shape, the respective sides thereof being adapted to be received into a compartment 28 having similarly shaped sides. Formed on the follower 27 is a forwardly projecting extension 29, the respective sides thereof constituting friction surfaces of a contour corresponding to the polygonal shape of the extension 18. The extension 29, and more especially the friction surfaces thereof, are adapted to be engaged by the longitudinal friction surfaces of the friction shoes. The forwardly extending friction member 29 is normally spaced from the rear end of the friction extension 18, said space being predetermined according to the capacity of the cushioning spring 21. The rear face of the follower 24 may be provided with a projection 30 around which fits one end of the lighter spring 25. In operation the supplemental cushioning springs are compressed after a predetermined movement of the cushioning spring 21, said compression occurring upon the contacting of the rear end of the extension 18 and the forward end of the extension 29. During this operation the friction shoes are rocked on their bearings and forced against the friction faces of the extensions 18 and 29 with increasing pressure as the progressive movement of the respective follower member continues.

In Figures 8 to 13, inclusive, I have shown an arrangement of friction draft gears in which cylindrical casings 31 and 32 are utilized, said casings being shown as applied to a draft rigging which latter involves the usual center sills 33, yoke member 34, coupler 35, and back stop 36. In this form of construction which is best illustrated in Figure 9, there is provided an axially extending friction member 37 having formed thereon oppositely disposed curved friction surfaces 38. Cooperating with said friction surfaces is a plurality of friction shoes 39, said friction shoes being suitably fulcrumed in bearing portions 40 provided in the casing 32 and having a curved friction engaging portion 41 corresponding in contour to the curved friction surfaces 38 formed on the axial extension 37. Each friction shoe is provided with a downwardly inclined and forwardly extending friction surface 42, said friction surface being adapted to coact with a friction wedging surface 43 provided on a wedging ring member 44. The ring member 44 is adapted to surround the respective friction shoes and upon relative movement of either casing 31 or 32 the inclined wedging surfaces 43 of said ring member are caused to bear against the respective friction surfaces 42 of the friction shoes and move the same about their fulcrums against the friction surfaces on the axial extension. During this movement the frictional grip or pressure is increased as the progressive movement of the respective follower member continues, and at the same time frictional resistance is effectively established between the wedging surface on the ring 44 and the adjacent coacting friction surfaces on the shoes 39. A relatively heavy capacity cushioning spring 45 is interposed between the wedging ring 44 and the end wall of the casing 31, the force of said spring being transmitted through the said wedging means to the friction shoes at points between the fulcrums of said shoes and the portions thereof contacting the axial extension 37.

In this arrangement I have shown the supplemental spring 46 operably interposed between the end wall 47 of the casing 32 and a movable follower 48 positioned for relative movement within a suitable compartment provided in said casing. Projecting from the forward end of the follower is an extension 49, said extension being of a cross sectional shape which will receive the ring member 44 when the respective casings are caused in effect to move toward each other. The ring member is provided with laterally disposed slots 50 capable of receiving the extending portions 51 of the follower 48. A friction draft gear constructed in accordance with this present modified arrangement provides a particularly effective combination of rocking friction shoes and coacting wedging surfaces in which a comparatively smooth gripping and releasing action occurs. Economy of manufacture and ease in assembly are also particular advantages of the construction shown in Figures 8 to 13, inclusive.

An arrangement of my invention particularly designed for use as a buffing gear on passenger railway cars is shown in Figures 14 to 18, inclusive. The same arrangement of cooperating casings 52 and 53 is utilized, a centrally located and longitudinally disposed friction tongue 54 being designed to cooperate with rocking friction members or shoes 55, the latter being suitably fulcrumed near the outer edges of the casing 53. Twin springs 56 are interposed between the respective friction shoes and the casing 52, the relative movement of at least one of said casings causing the friction shoes to rock and bring their friction engaging portion into contact with the friction tongue 54. The increasing force with which these friction shoes are moved against the friction tongue produces corresponding increase in pressure and frictional grip as the progressive movement of the follower member continues. In this arrangement of buffing gear a supplemental spring 57 may be utilized, said spring being actuated through the follower 58 when the extension 59 thereof is caused to come into contact with the end of the friction tongue 54. This latter movement occurs after a predetermined compression of the twin spring 56.

The twin springs arrangement in the buffing gear is similar to the twin spring construction shown in the draft gear illustrated in Figure 1, it being obvious that in said draft gear construction a supplemental spring can be readily interposed within the rear follower or casing 2 for subsequent action after a predetermined compression of the springs 11 and 12. Various other modifications of my invention may be produced and I do not wish to be understood as limiting the same to the several forms shown herein but reserve the right to make such changes as will not depart from the scope of my invention as set forth in the following claims.

I claim:

1. In a friction draft gear, the combination with cooperating follower members, one of said members being provided with a central longitudinally disposed friction tongue, a plurality of friction members each having a portion adapted to contact said friction tongue and another portion forming a fulcrum on the other of said follower members with a fixed axis, and cushioning means including a spring one end of which is arranged to contact the first mentioned follower member, the other end of which is adapted to engage at least one of the said friction members between the fulcrumed portion thereof and the portion engaging the friction tongue.

2. In a friction draft gear, the combination with cooperating follower members, one of said members having an axially disposed extension provided with friction surfaces, a plurality of friction shoes each of which is provided with a portion adapted to coact with an adjacent friction surface of said extension, means for fulcruming said friction shoes, said means including fixed bearing portions on one of the follower members adapted to receive fulcrumed portions of the friction shoes, and spring means interposed between one of said follower members and each of the friction shoes, the engagement of said spring means and the friction shoes being arranged between the fulcrum point and the friction portion of said shoes.

3. In a friction draft gear, the combination with cooperating follower members, one of said members being provided with an axially disposed extension having opposite friction surfaces, friction shoes each having a portion adapted to engage the friction surfaces of said extension and being formed with another portion providing a fulcrum, said fulcrumed portion having a fixed bearing in the other of said follower members, and means including a spring arranged to transmit the loads imparted to the gear, said spring acting to move the friction shoes upon their fulcrums for bringing said shoes into frictional contact with opposite sides of the axial extension.

4. In a friction draft gear, the combination with a casing provided with a centrally arranged portion providing an axially disposed friction member, friction shoes adapted to cooperate with said friction member, each of said friction shoes having a portion adapted to engage one side of said friction member, and another portion adapted to provide a fulcrum, another casing having portions adapted to form fixed bearings for the fulcrum portion of the friction shoes, and cushioning means interposed between the friction shoes and one end of the first named casing.

5. The combination with cooperating casings adapted to form followers, a centrally disposed friction member carried by one of said casings and extending into the other, friction shoes having portions adapted to contact said friction member, said friction shoes having fulcrum portions adapted to have their bearings fixed in one of said casings, and cushioning means engaging one of said casings, the other end of said cushioning means being arranged to engage the friction shoes between the fulcrum point and the portions thereof contacting the centrally disposed friction member.

6. The combination with a casing provided with a centrally arranged longitudinal extension forming a friction member, a friction shoe arranged upon each side of said member and having a portion adapted to contact the same, fulcrum means including projections formed on each of said friction shoes, another casing having portions adapted to provide fixed bearings for the fulcrum projections, and cushioning means including a spring interposed between said casings, one end of said spring being adapted to react against at least one of the friction shoes between its fulcrum and the portion thereof engaging the centrally disposed friction member.

7. The combination with cooperating casings, one of which is formed with a centrally located friction member and the other of which is provided with a plurality of bearing portions, friction shoes having portions providing fulcrums adapted to be definitely located in said bearing portions, said friction shoes being provided with other portions adapted to engage the centrally located friction member, and means interposed between said casings and operatively engaging said friction shoes for progressively increasing the friction grip of the shoes upon the centrally located friction member when the casings are moved toward each other.

8. The combination with cooperating casings, one of which is formed with a centrally located friction member and the other of which is provided with a plurality of bearing portions, said bearing portions being located in spaced relation from said friction member carried by the other of the casings, friction shoes having portions adapted to frictionally engage the centrally located friction member and being provided with other portions forming fulcrums adapted to be received in the aforesaid bearing portions provided in one of the casings for purely pivotal motion, and means yieldingly interposed between said casings, a portion of said yieldable means being arranged to contact each friction shoe between its fulcrum point and the portion of said shoe engaging the centrally located friction member whereby the relative approaching movement of either casing acts to compress said yieldable means and rock the friction shoes into progressively increasing frictional contact with the centrally located friction member.

9. In a friction draft gear, the combination with a casing having an axially disposed member provided with friction surfaces, another casing adapted to coact with said first named casing, friction shoes having portions fulcrumed about constant axes in said second named casing and being provided with other portions adapted to frictionally engage the surfaces of the axially disposed member, means including a member adapted to surround the axially disposed member and arranged to frictionally contact portions of the said friction shoes, and means including a spring interposed between said last named member and the first named casing whereby upon movement of the casings in effect toward each other the said friction shoes are caused to progressively increase the friction grip upon said axial member.

10. In a friction draft gear, the combination with a casing having an axially disposed member provided with friction surfaces, another casing adapted to coact with said first named casing, friction shoes having portions fulcrumed in a fixed manner in said second named casing and being provided with other portions adapted to frictionally engage the surfaces of the axially disposed member, a wedging member having portions adapted to frictionally engage portions of the said friction shoes, said wedging member being adapted to contact said shoes between their fulcrum points and their portions engaging the friction surfaces of said axially disposed member, and means including a spring operable between said wedging member and the casing provided with the axially disposed member.

11. In a friction draft gear, the combination with a casing having an axially disposed member provided with friction surfaces, another casing adapted to coact with said first named casing, friction shoes having portions fixedly fulcrumed in said second named casing and being provided with other portions adapted to frictionally engage the surfaces of the axially disposed member, a wedging ring having wedging faces adapted to contact the friction shoes, said ring being movable longitudinally of the gear for rocking the friction shoes toward the axially disposed member, and means including a spring having one end operatively engaging one face of the wedging ring and having its other end contacting the first named casing.

12. In a friction draft gear, the combination with a casing having an axially disposed member provided with friction surfaces, another casing adapted to coact with said first named casing, friction shoes having portions fulcrumed in said second named casing and being provided with other portions adapted to frictionally engage the surfaces of the axially disposed member, means including a wedge member adapted to move said friction shoes into contact with the friction surfaces provided on the axially arranged member, a spring interposed between said wedging member and the casing carrying said axially disposed member, a follower member provided in said second named casing adapted to be engaged by said axially disposed member after a predetermined movement of the gear, and a spring interposed between said follower member and a wall of said second named casing.

13. A friction shock absorbing mechanism comprising coacting casings one of which is formed with an axially disposed extension having friction surfaces and the other of which is provided with bearing portions, friction shoes fulcrumed in said bearing portions and being provided with other portions adapted to engage the said friction surfaces on the axial extension, a spring interposed between the first mentioned casing and the shoes, a follower member longitudinally movable in one of said casings adapted to be engaged by the axial extension after a predetermined movement of the mechanism, and a supplemental spring arranged between said follower member and one wall of one of said casings.

14. A friction shock absorbing mechanism involving coacting casings, an axially disposed and centrally located extension provided with friction surfaces, said extension being carried by one of the casings, friction shoes having fixed fulcrum points located in the other of said casings, the friction shoes being provided with portions adapted to be moved radially inward toward the center of the axial extension, and cushioning means including a spring interposed between the casing carrying the axial extension and the friction shoes fulcrumed in the other of said casings.

15. In a draft rigging, the combination with a front follower member having an axial extension provided with friction surfaces, a rear follower member provided with bearing portions, friction shoes fixedly fulcrumed in said bearing portions and having friction surfaces adapted to contact the aforesaid friction surfaces, and cushioning means including a spring having one end contacting the front follower and the other end operable against the friction shoes at points between their fulcrum and friction surfaces whereby movement of the front and rear followers in effect toward each other causes a progressively increasing frictional grip between the shoes and said axially disposed extension.

In testimony whereof I affix my signature.

WILLIAM A. MITCHELL.